US009217757B2

(12) United States Patent
Hergesheimer et al.

(10) Patent No.: US 9,217,757 B2
(45) Date of Patent: Dec. 22, 2015

(54) SYSTEMS AND METHODS FOR 3-AXIS ACCELEROMETER CALIBRATION (71) Applicants: Peter Hergesheimer, Encinitas, CA (US); Todd Sprague, Placerville, CA (US); Alexandre Dlagnekov, Escondido, CA (US)

(72) Inventors: Peter Hergesheimer, Encinitas, CA (US); Todd Sprague, Placerville, CA (US); Alexandre Dlagnekov, Escondido, CA (US)

(73) Assignee: CalAmp Corp., Oxnard, CA (US)

( * ) Notice: Subject to any disclaimer, the term of this patent is extended or adjusted under 35 U.S.C. 154(b) by 36 days.

(21) Appl. No.: 13/622,844

(22) Filed: Sep. 19, 2012

(65) Prior Publication Data

US 2013/0073142 A1    Mar. 21, 2013

Related U.S. Application Data (60) Provisional application No. 61/537,051, filed on Sep. 20, 2011.

(51) Int. Cl.
*G01M 17/00* (2006.01)
*G06F 7/00* (2006.01)
*G06F 19/00* (2011.01)
*G01P 15/18* (2013.01)
*G01P 21/00* (2006.01)

(52) U.S. Cl.
CPC ............... *G01P 15/18* (2013.01); *G01P 21/00* (2013.01)

(58) Field of Classification Search
CPC ........................................ G01C 21/00
USPC .......................................... 701/33.1
See application file for complete search history.

(56) References Cited

U.S. PATENT DOCUMENTS

| | | | | |
|---|---|---|---|---|
| 5,117,375 | A | * | 5/1992 | Worcester et al. ............... 702/92 |
| 5,862,511 | A | * | 1/1999 | Croyle et al. ................. 701/445 |
| 6,532,419 | B1 | * | 3/2003 | Begin et al. .................... 701/504 |
| 2002/0100310 | A1 | * | 8/2002 | Begin ............................. 73/1.37 |
| 2008/0202199 | A1 | * | 8/2008 | Finley et al. ................... 73/1.77 |
| 2010/0097316 | A1 | * | 4/2010 | Shaw et al. .................... 345/158 |
| 2011/0264393 | A1 | * | 10/2011 | An et al. ....................... 702/104 |
| 2014/0236518 | A1 | | 8/2014 | Hergesheimer et al. |
| 2014/0236519 | A1 | | 8/2014 | Hergesheimer et al. |

FOREIGN PATENT DOCUMENTS

| | | |
|---|---|---|
| WO | 0017607 | 3/2000 |
| WO | 0218873 | 3/2002 |

* cited by examiner

*Primary Examiner* — Yonel Beaulieu
*Assistant Examiner* — Lail Kleinman
(74) *Attorney, Agent, or Firm* — KPPB LLP (57) ABSTRACT Systems and methods for calibrating the alignment of 3-axis accelerometers in accordance embodiments of the invention are disclosed. In one embodiment of the invention, a telematics system includes a global positioning system (GPS) receiver, an accelerometer, and a processor, wherein the GPS receiver is configured to determine velocity information, wherein the accelerometer is configured to determine accelerometer acceleration information along one or more accelerometer axes, and wherein the processor is configured to receive a velocity information sample using the GPS receiver, determine GPS acceleration information along one or more vehicle axes using the velocity information sample, receive accelerometer acceleration information samples using the accelerometer, and calibrate one of the vehicle axes to an accelerometer axis in the one or more accelerometer axes using the GPS acceleration information sample and the accelerometer acceleration information sample.

21 Claims, 6 Drawing Sheets

SYSTEMS AND METHODS FOR 3-AXIS ACCELEROMETER CALIBRATION

CROSS-REFERENCE TO RELATED APPLICATIONS

This application claims the benefit of U.S. Provisional Patent Application No. 61/537,051, filed on Sep. 20, 2011, the disclosure of which is hereby incorporated by reference in its entirety.

FIELD OF THE INVENTION

The present invention is generally related to calibrating the alignment of a 3-axis accelerometer and more specifically to calibrating a 3-axis accelerometer to align with a vehicle's axis for accurate vehicle acceleration data.

BACKGROUND OF THE INVENTION

A Global Positioning System (GPS) is a space based global navigation satellite system that utilizes a network of geosynchronous satellites which may be utilized by a GPS receiver to determine its location. Many telematics systems incorporate a Global Positioning System (GPS) receiver, which can be used to obtain the location of a vehicle at a certain measured time. By comparing the location of a vehicle at a plurality of measured times, the speed of the vehicle may be determined. The acceleration of the vehicle may be determined as the change in speed divided by the time between the measurements. A GPS receiver's ability to determine acceleration can be limited due to the dependence of the measurement upon factors such as reception and satellite availability. In addition to location information, a GPS receiver may also be configured to provide time data.

An accelerometer is a device that measures acceleration associated with the weight experienced by a test mass in the frame of reference of the accelerometer device. The acceleration measured by an accelerometer is therefore a weight per unit of test mass, or g-force. Thereby, a stationary accelerometer in a vehicle would experience the earth's gravity while a free falling one would not.

SUMMARY OF THE INVENTION

Systems and methods for calibrating the alignment of 3-axis accelerometers in accordance embodiments of the invention are disclosed. In one embodiment of the invention, a telematics system includes a global positioning system (GPS) receiver. an accelerometer, and a processor, wherein the GPS receiver is configured to determine velocity information, wherein the accelerometer is configured to determine accelerometer acceleration information along one or more accelerometer axes, and wherein the processor is configured to receive a velocity information sample using the GPS receiver, determine GPS acceleration information along one or more vehicle axes using the velocity information sample, receive accelerometer acceleration information samples using the accelerometer, and calibrate one of the vehicle axes to an accelerometer axis in the one or more accelerometer axes using the GPS acceleration information sample and the accelerometer acceleration information sample.

In another embodiment of the invention, the accelerometer is a 3-axis accelerometer.

In an additional embodiment of the invention, the accelerometer includes a first sampling rate and the telematics system further includes an accelerometer accumulator configured to accumulate a plurality of accelerometer acceleration information samples taken at the first sampling rate.

In yet another additional embodiment of the invention, the GPS receiver includes a second sampling rate and the telematics system further includes a GPS accumulator configured to accumulate a plurality of velocity information samples taken at the second sampling rate.

In still another additional embodiment of the invention, the processor is configured to match the first sampling rate to the second sampling rate.

In yet still another additional embodiment of the invention, the processor is configured to calibrate a vehicle axis to an accelerometer axis using a least squares method.

In yet another embodiment of the invention, the processor is configured to perform the least squares method using a Gaussian elimination solver.

In still another embodiment of the invention, the telematics system further includes motion sample storage configured to store a plurality of motion samples, where motion samples are selected from the group consisting of GPS location information samples and accelerometer acceleration information samples.

In yet still another embodiment of the invention, the processor is configured to perform the least squares method using at least one motion sample in the plurality of motion samples.

In yet another additional embodiment of the invention, the processor is further configured to detect a vertical vector in the calibrated vehicle axes and recalibrate the calibrated vehicles axes using the using the GPS acceleration information sample, the accelerometer acceleration information sample, and the detected vertical vector.

In still another additional embodiment of the invention, the processor is further configured to detect a lateral vector in the calibrated vehicle axes and recalibrate the calibrated vehicles axes using the using the GPS acceleration information sample, the accelerometer acceleration information sample, and the detected lateral vector.

Still another embodiment of the invention includes a method for calibrating an accelerometer including receiving velocity information samples using a telematics system, where the telematics system is mounted in a vehicle having one or more vehicle axes, determining vehicle acceleration information samples along a vehicle axis in the one or more vehicle axes using the velocity information and the telematics system, receiving accelerometer acceleration information samples along one or more accelerometer axes using the telematics system, and calibrating a vehicle axis in the one or more vehicle axes to an accelerometer axis in the one or more accelerometer axes using the vehicle acceleration information samples, the accelerometer acceleration information samples, and the telematics system.

In yet another additional embodiment of the invention, receiving velocity information samples using the telematics system further includes receiving the velocity information samples at a first sampling rate.

In still another additional embodiment of the invention, receiving accelerometer acceleration information samples at a second sampling rate.

In yet still another additional embodiment of the invention, calibrating an accelerometer further includes matching the first sampling rate to the second sampling rate using the telematics system.

In yet another embodiment of the invention, calibrating a vehicle axis to an accelerometer axis includes performing a least squares method using the telematics system.

In still another embodiment of the invention, performing the least squares method includes performing a Gaussian elimination solver using the telematics system.

In yet still another embodiment of the invention, calibrating an accelerometer further includes storing a plurality of motion samples using the telematics system, where motion samples are selected from the group consisting of velocity information samples and accelerometer acceleration information samples.

In yet another additional embodiment of the invention, calibrating an accelerometer further includes performing the least squares method using at least one motion sample in the plurality of motion samples and the telematics system.

In still another additional embodiment of the invention, calibrating an accelerometer further includes detecting a vertical vector in the calibrated vehicle axes using the telematics system and recalibrating the calibrated vehicles axes using the using the GPS acceleration information sample, the accelerometer acceleration information sample, the detected vertical vector, and the telematics system.

In yet still another additional embodiment of the invention, calibrating an accelerometer further includes detecting a lateral vector in the calibrated vehicle axes using the telematics system and recalibrating the calibrated vehicles axes using the using the GPS acceleration information sample, the accelerometer acceleration information sample, the detected lateral vector, and the telematics system.

DETAILED DESCRIPTION

Turning now to the drawings, systems and methods for calibrating the alignment of a 3-axis accelerometer relative to a vehicle's axes in order to capture data concerning vehicle behavior, including vehicle acceleration data, in accordance with embodiments of the invention are illustrated. Information concerning vehicle speed and acceleration can provide insights into driver behavior. For example, such information can indicate a variety of driver behaviors, including, but not limited to, performing hard cornering or suddenly stopping while driving. In accordance with many embodiments of the invention, vehicle speed may be calculated using information provided by a Global Position System (GPS) receiver by dividing the distance traveled by the GPS receiver by the time between measurements taken by the GPS receiver. In a number of embodiments, the GPS receiver is configured to determine heading information. In several embodiments, the GPS receiver is configured to determine velocity information using the signals received by the GPS receiver. A GPS receiver can determine velocity information in a variety of ways in accordance with embodiments of the invention, including, but not limited to, measuring the Doppler shift of the received signals. The differences in vehicle speed between measurements taken by the GPS receiver may be used to determine acceleration information for the vehicle. However, the use of GPS data to calculate acceleration information is dependent upon a variety of factors, such as reception and satellite availability, which may present problems when calculating the acceleration information. In accordance with embodiments of the invention, a variety of devices configured to determine location and/or velocity information other than GPS receivers may be used.

Acceleration information for a vehicle may also be captured using an accelerometer or other device configured to determine acceleration information; these devices are often installed on a vehicle or mobile device. Accelerometers installed on a vehicle may not be accurately aligned with the vehicle axes, limiting the accuracy of the acceleration data captured by the accelerometer. In a number of embodiments, the accelerometer axes do not change relative to the vehicle axes. A 3-axis accelerometer is an accelerometer configured to determine acceleration in the X, Y, and Z axes, corresponding to the forward, lateral, and vertical vectors measured by the 3-axis accelerometer. Accurate accelerometer data aligned with the axes of the vehicle is beneficial in many applications, including, but not limited to, telematics. Telematics is the integrated use of telecommunications and informatics, including, but not limited to, monitoring vehicle movement and behavior.

In accordance with embodiments of the invention, a 3-axis accelerometer is calibrated to align with a vehicle's vertical, lateral, and forward axes using acceleration information and location information of the vehicle. In many embodiments, the location information is captured using a GPS receiver and the acceleration information is captured using the 3-axis accelerometer, although other devices capable of capturing location and/or acceleration information may be utilized in accordance with embodiments of the invention. These measurements may be taken based upon an occurrence of certain events, in response to a request for calibration, and/or performed continuously. In many embodiments, acceleration and location information is measured when location information captured using the GPS receiver indicates that the vehicle is stationary. In several embodiments, acceleration and location information is measured when the location information captures using the GPS receiver indicates that the vehicle is in motion and/or that the vehicle is traveling over a certain speed. Data analysis, including filtering, may be utilized to filter useful data from erroneous or irrelevant measurements captured by the 3-axis accelerometer and/or GPS receiver and/or aligned data computed using the 3-axis accelerometer and/or GPS receiver data.

In many embodiments, the axes of a vehicle can be defined based upon a vertical vector, indicating vertical motion of a vehicle associated with a vertical Z axis, a forward vector, indicating the forward motion of a vehicle associated with a forward X axis, and a lateral vector, indicating the lateral motion of a vehicle associated with a lateral Y axis. The vertical vector can be used for comparison between vectors detected by an accelerometer or from data captured using a GPS receiver. Several embodiments continuously compare and/or combine results between calibration events to more accurately calibrate the 3-axis accelerometer to the vehicle.

Systems and methods for calibrating a 3-axis accelerometer to align with the axes of a vehicle utilizing information captured using an accelerometer and/or a GPS receiver in accordance with embodiments of the invention are discussed further below.

Telematics System Architecture

Figure 1:
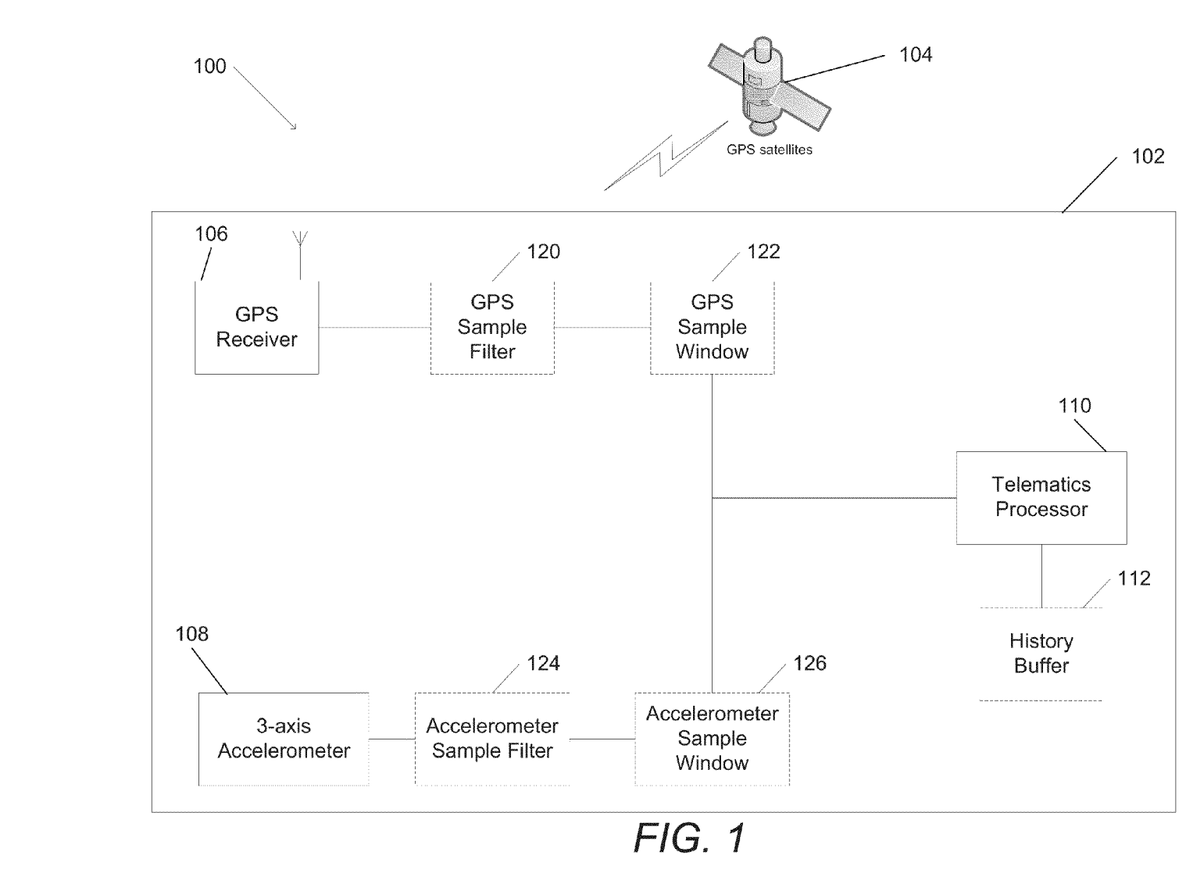
FIG. 1 illustrates a system for calibrating a 3-axis accelerometer with an accelerometer, GPS unit and telematics processor in accordance with an embodiment of the invention.

Telematics systems are utilized in vehicles to determine and/or report the location and behavior of the vehicle. A telematics system containing a 3-axis accelerometer aligned to vehicle axes in accordance with an embodiment of the invention is illustrated in FIG. 1. The telematics system 100 includes a telematics unit 102, where the telematics unit 102 includes a GPS receiver 106, a 3-axis accelerometer 108, and a telematics process 110. The GPS receiver 106 and the 3-axis accelerometer 108 are configured to communicate with a telematics processor 110. The GPS receiver 106 is configured to receive signals from one or more GPS satellites 104, if available. In accordance with embodiments of the invention, the GPS receiver 106 and the 3-axis accelerometer 108 are configured to provide information to the telematics processor 110 at a sample rate; the sample rate of the GPS receiver 106 and the 3-axis accelerometer 108 may or may not be equivalent.

In several embodiments, the GPS receiver 106 is configured to determine location information using signals received from a number of GPS satellites 104. In many embodiments, the GPS receiver 106 is configured to determine velocity and/or acceleration information using the received location information. In a number of embodiments, the GPS receiver is configured to determine velocity information by measuring the Doppler shift of the signals received from the GPS satellites 104. In many embodiments, the 3-axis accelerometer 108 can generate 3-axis acceleration data from vehicle motion. In many embodiments, the telematics processor 110 is configured to calibrate the 3-axis accelerometer 108 to correlate the 3-axis acceleration data generated by the 3-axis accelerometer 108 to the axes of the vehicle in which the telematics system 100 is installed using velocity and/or acceleration information. In a number of embodiments, the telematics processor 110 is configured to determine velocity and/or acceleration information using location information received using the GPS receiver 106. In multiple embodiments, the telematics processor 110 utilizes acceleration and/or velocity information generated by the GPS receiver 106.

In accordance with embodiments of the invention, the GPS receiver 106 is configured to determine location information at a GPS sampling rate. Likewise, the 3-axis accelerometer 108 is configured to determine acceleration information at an accelerometer sampling rate. In several embodiments, the telematics unit 102 includes a GPS sample filter 120 and/or an accelerometer sample filter 124. The GPS sample filter 120 is configured to sample and convert the sampling rate of the GPS receiver 106. The accelerometer sample filter 124 is configured to sample and convert the sampling rate of the 3-axis accelerometer 108. In many embodiments, the GPS sample filter 120 and/or the accelerometer sample filter 124 are configured to match the GPS sampling rate to the accelerometer sampling rate. For example, if the GPS receiver 106 has a sampling rate of 250 milliseconds and the 3-axis accelerometer 108 has a sampling rate of 50 milliseconds, the accelerometer sample filter 124 can utilize five samples generated using the 3-axis accelerometer 108 to match the 250 millisecond sample rate of the GPS receiver 106. The accelerometer sample filter 124 and/or the GPS sample filter 120 perform the rate matching in a variety of ways, including, but not limited to, averaging information received, selecting the highest sample received, selecting the smallest sample received, selecting one sample at random, and/or selecting the last sample. In many embodiments, the accelerometer sample filter 124 and/or the GPS sample filter 120 are implemented using the telematics processor 110 and/or the history buffer 112.

In a number of embodiments, the telematics unit 102 includes a GPS sample window 122 configured to store one or more samples received using the GPS receiver 106. In several embodiments, the telematics unit 102 includes an accelerometer sample window 126 configured to store one or more samples received using the 3-axis accelerometer 108. In many embodiments, the telematics processor 110 can accumulate information provided by the GPS receiver 106 and the 3-axis accelerometer 108 along with calibration information using a history buffer 112. In several embodiments, the telematics processor 110 is configured to use the accumulated information to perform the calibration of the 3-axis accelerometer 108 to the vehicle axes. In a number of embodiments, the telematics processor 110 is configured to adapt the calibration of the 3-axis accelerometer 108 to the vehicle axes using the location and/or velocity information determined using the GPS receiver 106. In many embodiments, the GPS sample window 122 and/or the accelerometer sample window 126 is implemented using the telematics processor 110 and/or the history buffer 112.

A specific telematics system is described above; however, a variety of telematics systems, including those which receive location information without using a GPS receiver, may be utilized in accordance with embodiments of the invention. Processes for calibrating a 3-axis accelerometer relative to the axes of a vehicle to which the 3-axis accelerometer is installed are discussed further below.

Comparison of Accelerometer Axes and Vehicle Axes

Figure 2:
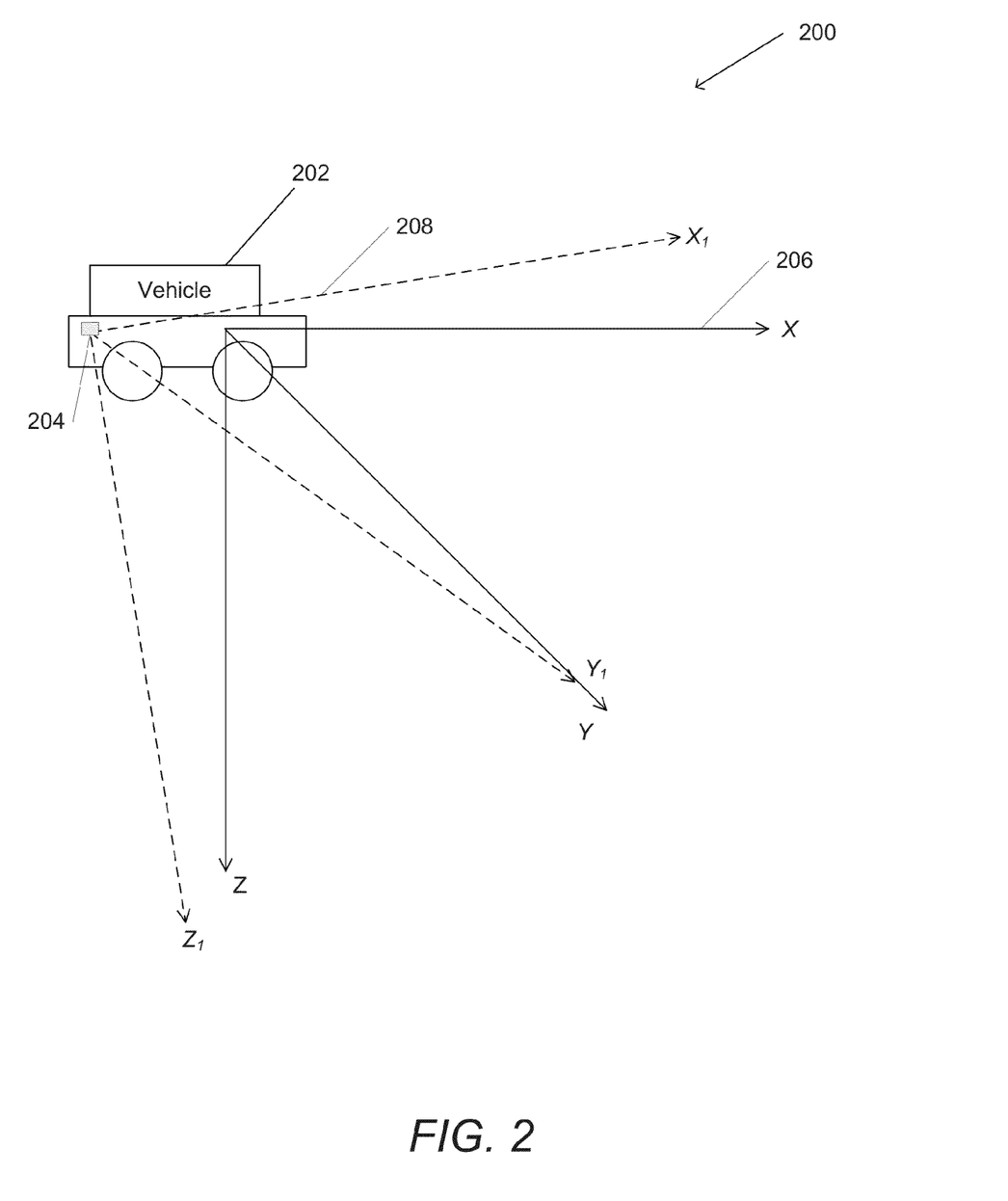
FIG. 2 illustrates the alignment of the axes of a 3-axis accelerometer to the axes of a vehicle in accordance with an embodiment of the invention.

In order to provide accurate acceleration information, a 3-axis accelerometer is calibrated to the axes of the vehicle in which the 3-axis accelerometer is installed. An illustration of the relative alignment of the axes of a 3-axis accelerometer to the axes of a vehicle in accordance with embodiments of the invention is shown in FIG. 2. Coordinate axes 200 show the relative alignment of the axes 208 of a 3-axis accelerometer 204 and the axes 206 of a vehicle 202 to which the accelerometer is mounted. The X, Y and Z coordinate axes 206 are the axes of a vehicle. The $X_1$, $Y_1$ and $Z_1$ axes are the axes 208 of the 3-axis accelerometer 204. In the illustrated embodiment, the axes 208 of the 3-axis accelerometer 204 are not aligned with the axes 206 of the vehicle 202. Therefore, in order to determine acceleration along the axes 206 of the vehicle, the 3-axis accelerometer's 204 axes 208 $X_1$, $Y_1$ and $Z_1$ are calibrated with respect to the axes 206 X, Y and Z of the vehicle 202; processes for performing this calibration are discussed in more detail below. In many embodiments of the invention, the axes 206 X, Y and Z of the vehicle 202 correspond to a gravity vector, a lateral directional vector of travel along a horizontal plane, and the orthogonal to the gravity vector and the lateral motion vector; accordingly, the calibration of the accelerometer's 204 axes 208 $X_1$, $Y_1$ and $Z_1$ are to the gravity vector, the lateral motion vector, and the orthogonal of the gravity vector and the lateral motion vector. In many embodiments, the 3-axis accelerometer 204 is part of a telematics system installed in the vehicle 202.

Although a specific relative alignment between the axes of a 3-axis accelerometer and a vehicle described above, a variety of alignments, including those where the axes of a 3-axis accelerometer are aligned to a gravity vector, a lateral motion vector, and the orthogonal of the gravity vector and the lateral motion vector, may be utilized in accordance with embodiments of the invention. Processes for calibrating 3-axis accelerometers in accordance with embodiments of the invention are described below.

3-Axis Accelerometer Calibration Using GPS Location Information

Figure 3:
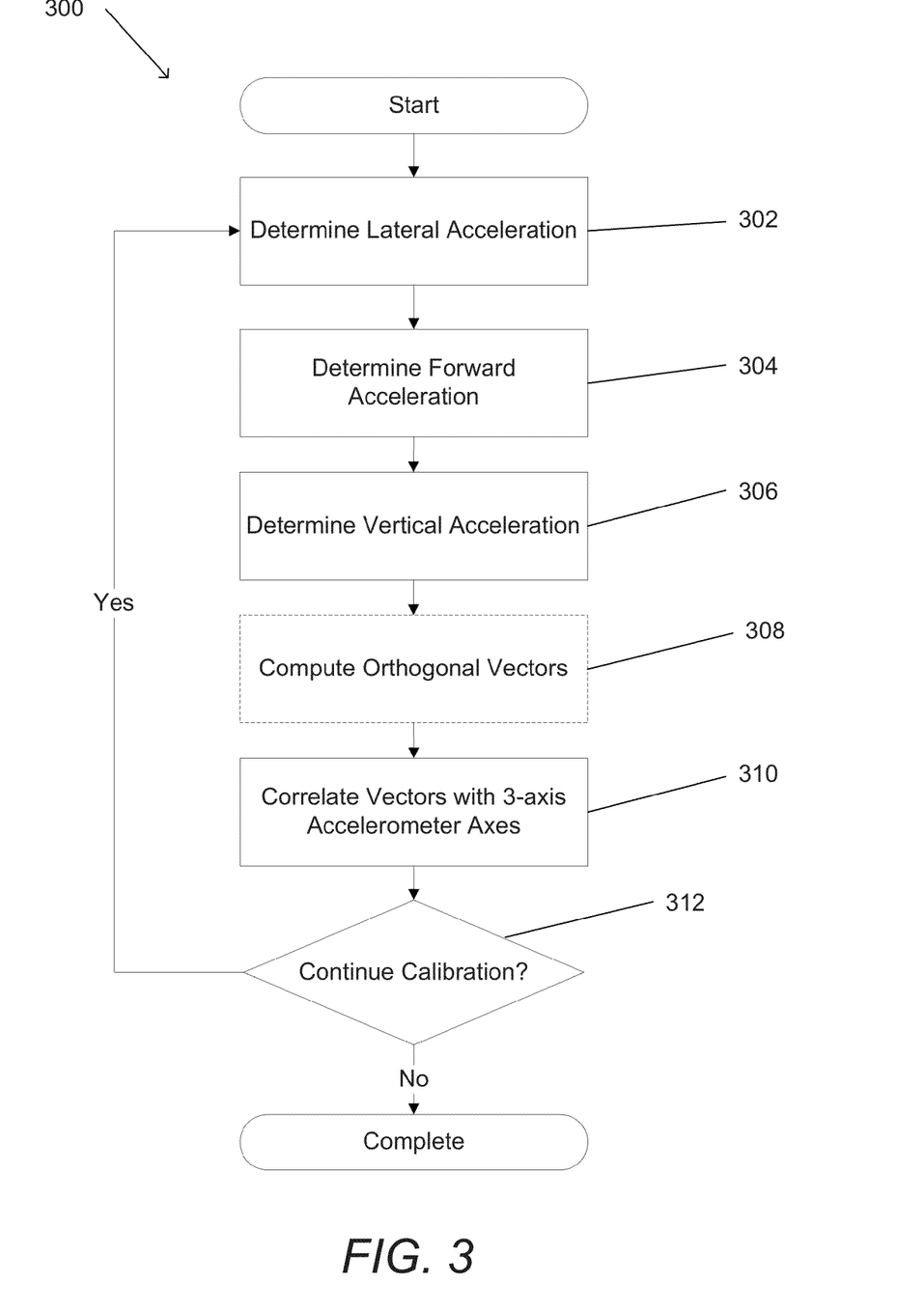
FIG. 3 is a flow chart illustrating a process for calibrating the axes of an accelerometer to the vertical, forward and lateral axes of a vehicle in accordance with an embodiment of the invention.

The location, velocity, and acceleration of a vehicle can be captured using a GPS receiver and utilized to determine the motion of the axes of a vehicle relative to the Earth. This information can be correlated to information measured using a 3-axis accelerometer, thereby calibrating the 3-axis accelerometer to the vehicle. A process for calibrating the axes of a 3-axis accelerometer to the vertical, forward and lateral axes of a vehicle containing both the 3-axis accelerometer and the GPS receiver in accordance with an embodiment of the invention is illustrated in FIG. 3.

The process 300 includes determining (302) lateral acceleration. Forward acceleration is determined (304). Vertical acceleration is determined (306). In several embodiments, orthogonal vectors representing the vertical, forward, and lateral vectors are computed (308). The vertical, forward, and lateral vectors are correlated (310) to the axes of the 3-axis accelerometer. If necessary, the calibration process continues (312) beginning with step 302. If the calibration process does not continue (312), the process ends.

In many embodiments, lateral acceleration is determined (302) using information captured using a 3-axis accelerometer when a GPS receiver indicates that the vehicle is not in motion. In a number of embodiments, forward acceleration is determined (304) using information measured using the 3-axis accelerometer when location information measured using the GPS receiver indicates that the vehicle is in motion. In several embodiments, forward acceleration is determined (304) when a vehicle exceeds a predetermined speed. In several embodiments, vertical acceleration is determined (306) by computing the cross product of the lateral acceleration and forward acceleration. In many embodiments, the orthogonal vectors are computed (308) by calculating the cross product of every combination of the forward acceleration, the lateral acceleration, and the vertical acceleration. In a number of embodiments, calibration continues (312) if the magnitude of the correlation between the 3-axis accelerometer and the vertical, forward, and lateral vectors exceeds a threshold value. In several embodiments, the calibration continues (312) while the vehicle is in motion. In many embodiments, the calibration continues (312) while the vehicle is turned on. In a number of embodiments, the calibration is only performed once and does not continue (312). In a number of embodiments, the calibration process continues (312) when the determined (302, 304, 306) lateral, forward, and/or vertical accelerations exceed a threshold value; the threshold value may be pre-determined or determined dynamically. In several embodiments, the calibration process continues (312) until a certain number of successful calibration attempts have been reached; the number of successful calibration attempts may be pre-determined or determined dynamically.

In accordance with many embodiments of the invention, the determined (302, 304, 306) vertical, forward, and/or lateral accelerations are stored in a history buffer. Correlating (310) the vertical, forward, and lateral accelerations with the 3-axis accelerometer axes utilizes the stored vertical, forward, and/or lateral accelerations. In certain embodiments, once a new lateral acceleration is determined (302), correlating (310) the accelerations with the 3-axis accelerometer axes utilizes the lateral acceleration and forward and vertical accelerations stored in the history buffer. Likewise, in several embodiments, once a new forward acceleration is determined (304), calibration (310) utilizes vertical and lateral accelerations stored in the history buffer. In various embodiments, the vertical, forward, and/or lateral accelerations stored in the history buffer are used to predetermine what a vehicle's vertical, forward and lateral axes are and an accelerometer's axes system are calibrated to fit the predetermined vehicle axes. In many embodiments, the vertical, forward, and/or lateral accelerations stored in the history buffer correlate to GPS acceleration samples taken using the GPS receiver and/or accelerometer acceleration samples taken using the 3-axis accelerometer.

In accordance with embodiments of the invention, correlating (310) the vectors corresponding with the axes of the vehicle with the 3-axis accelerometer axes may be performed using a least squares method. Given motion vector samples $[X_i, Y_i, Z_i]$, where i is the number of motion vector samples, vertical alignment vector $[V_x, V_y, V_z]$, forward GPS acceleration sample $F_i$ and lateral GPS acceleration sample $L_i$ and vertical acceleration $$V_i = \sqrt{X_i^2 + Y_i^2 + Z_i^2 - F_i^2 - L_i^2}$$

the alignment vectors which calibrate the axes of the 3-axis accelerometer to the axes of the vehicle are calculated by:

$$B_1 = A_{11} * V_x + A_{12} * V_y + A_{13} * V_z$$

$$B_2 = A_{12} * V_x + A_{22} * V_y + A_{23} * V_z$$

$$B_3 = A_{13} * V_x + A_{23} * V_y + A_{33} * V_z$$

where $$A_{11} = \Sigma X_i^2$$

$$A_{12} = \Sigma X_i * Y_i$$

$$A_{13} = \Sigma X_i * Z_i$$

$$A_{22} = \Sigma Y_i^2$$

$$A_{23} = \Sigma Y_i * Z_i$$

$$A_{33} = \Sigma Z_i^2$$

$$B_1 = \Sigma V_i * X_i$$

$$B_2 = \Sigma V_i * Y_i$$

$$B_3 = \Sigma V_i * Z_i$$

In accordance with embodiments of the invention, the vertical alignment vector $[V_x, V_y, V_z]$ is determined using a Gaussian elimination process. For example, $$V_z = \frac{D_2 * C_{11} - D_1 * C_{12}}{C_{11} * C_{22} - C_{12}^2}$$

$$V_y = \frac{D_1 * C_{22} - D_2 * C_{12}}{C_{11} * C_{22} - C_{12}^2}$$

and $V_x$ is the maximum of $$V_x = \frac{B_1 - A_{12} * V_y - A_{13} * V_z}{A_{11}}$$

-continued $$V_x = \frac{B_2 - A_{22} * V_y - A_{23} * V_z}{A_{12}}$$

$$V_x = \frac{B_3 - A_{23} * V_y - A_{33} * V_z}{A_{13}}$$

where $$C_{11} = A_{11} * A_{22} - A_{12}^2$$

$$C_{12} = A_{11} * A_{23} - A_{12} * A_{13}$$

$$C_{22} = A_{11} * A_{33} - A_{13}^2$$

$$D_1 = B_2 * A_{11} - B_1 * A_{12}$$

$$D_2 = \sum B_3 * A_{11} - B_1 * A_{13}$$

Although a specific process for calibrating the axes of a 3-axis accelerometer to the axes of a vehicle is discussed above with respect to FIG. 3, any of a variety of processes, including those which obtain information related to the location, velocity, and/or acceleration of a vehicle using devices other than GPS receivers, may be performed in accordance with embodiments of the invention. Processes for calibrating the axes of a 3-axis accelerometer in accordance with embodiments of the invention are disclosed below.

Vertical Vector Calibration

Figure 4:
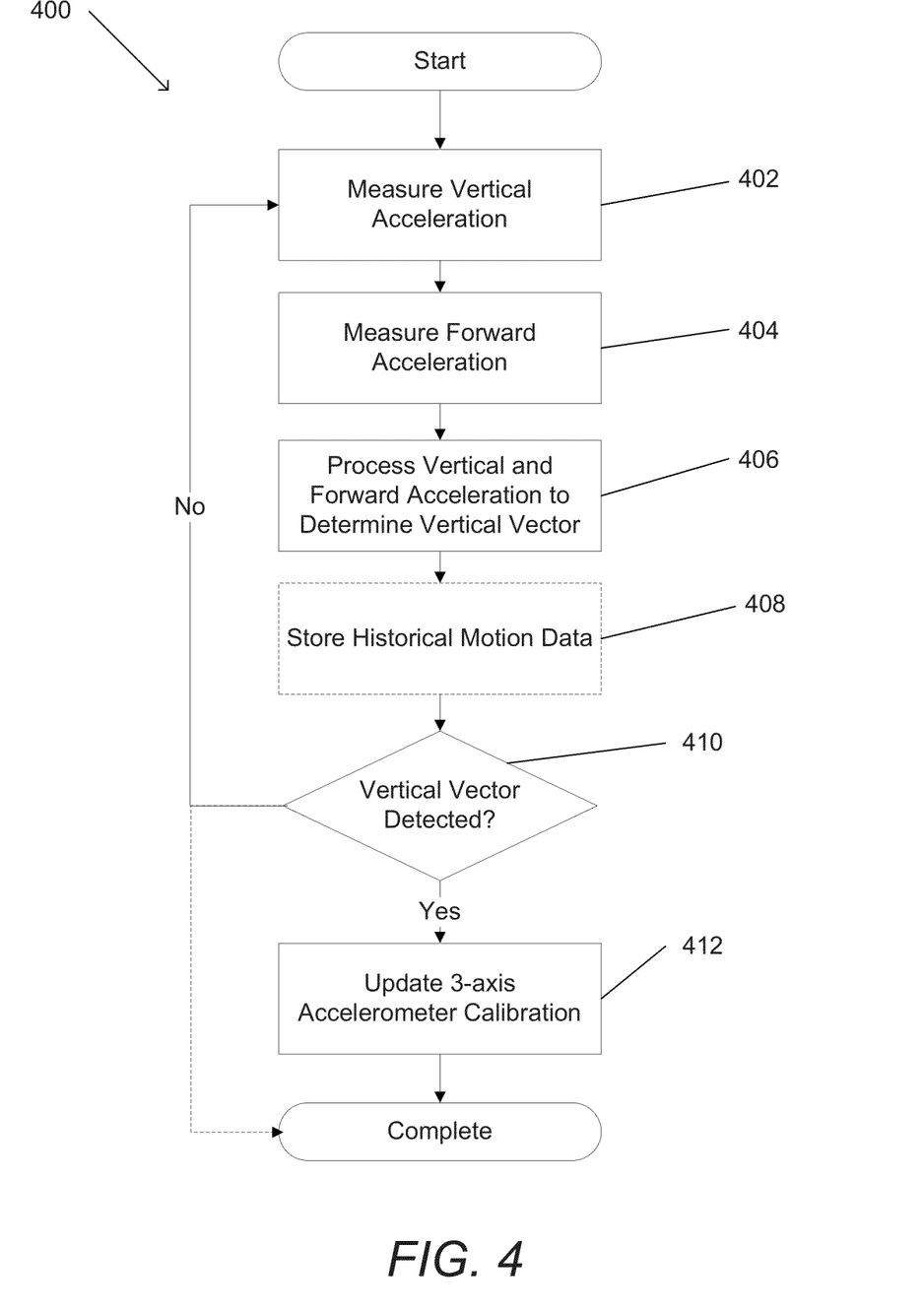
FIG. 4 is a flow chart illustrating a process for calibrating a 3-axis accelerometer along its vertical vector in accordance with an embodiment of the invention.

Filtering the information measured using a 3-axis accelerometer, a GPS receiver, and/or data aligning the 3-axis accelerometer and the GPS receiver can eliminate erroneous data, including, but not limited to, data from a vehicle stopped on an incline. A process for calibrating a vertical vector measured using a 3-axis accelerometer to filter erroneous data in accordance with an embodiment of the invention is illustrated in FIG. 4. The process 400 includes measuring (402) vertical acceleration using a 3-axis accelerometer. The forward acceleration of the 3-axis accelerometer is measured (404). The forward acceleration and the vertical acceleration are processed (406) to determine a vertical vector. In several embodiments, the vertical acceleration and/or the forward acceleration are stored (408) as part or all of the historical motion data. If the vertical vector is detected (410) in the processed (408) vertical and forward accelerations, the 3-axis accelerometer calibration is updated (412) to compensate for the vertical vector. In a number of embodiments, if a vertical vector is not detected (410), the process 400 repeats. In many embodiments, if a vertical vector is not detected (410), the process 400 ends.

In many embodiments, the vertical vector is measured (402) when the speed of the vehicle exceeds a threshold; the threshold may be pre-determined or determined dynamically. In several embodiments, the forward acceleration of the 3-axis accelerometer is measured (404) when the forward acceleration exceeds a threshold acceleration; the threshold acceleration may be pre-determined or determined dynamically. In a number of embodiments, the motion of the vehicle is determined using a GPS receiver. In several embodiments, elevation data measured using the GPS receiver is utilized to determine whether the vehicle is likely stopped on an incline. In many embodiments, determining that the vehicle is at rest using the GPS receiver involves no change in GPS receiver position over time. In a number of embodiments, detecting no GPS receiver movement can involve a determination of whether there is any GPS receiver movement over time that takes consideration of erroneous GPS receiver movement readings. In many embodiments, the motion of the vehicle is determined using the 3-axis accelerometer. In several embodiments, detecting constant acceleration using an accelerometer is made in an event with no movement of a vehicle as detected by a GPS receiver. In several embodiments, the stored (408) historical motion data includes data captured using the GPS receiver and/or 3-axis accelerometer. In certain embodiments, only a selection of data is stored (408) as historical motion data, such as data that corresponds to certain events of interest. In a number of embodiments, all data captured using the GPS receiver and/or 3-axis accelerometer is stored (408) as historical motion data.

For example, when the GPS receiver indicates that a vehicle is stationary and the 3-axis accelerometer experiences constant acceleration, an assumption can be made that the vehicle is stationary and that the 3-axis accelerometer output is indicative of vertical acceleration due to gravity. When both the 3-axis accelerometer and the GPS receiver indicate vehicle speeds above a certain threshold value and increasing with a constant direction, an assumption can be made that the vehicle is accelerating in approximately a straight line. When a calibration event occurs, the calibration of the 3-axis accelerometer is updated (412) utilizing the determined (406) vertical vector to compensate for the vertical acceleration due to gravity as measured by the 3-axis accelerometer.

In numerous embodiments, the processing (406) of current motion data includes analysis and filtering of data to provide data veracity. In several embodiments, current measured (402, 404) vertical and forward accelerations are processed (406) using historical motion data. Data analysis can utilize filters, including least mean squares, least squares, and Gaussian elimination methods, including those described above with respect to FIG. 3.

Although specific processes are discussed above for calibrating a 3-axis accelerometer to compensate for acceleration along its vertical vector, any of a variety of processes can be utilized, including processes that operate on vehicles that are in motion, in accordance with embodiments of the invention. Processes for calibrating a 3-axis accelerometer along its forward vector in accordance with embodiments of the invention are described below.

Lateral Vector Calibration

Figure 5:
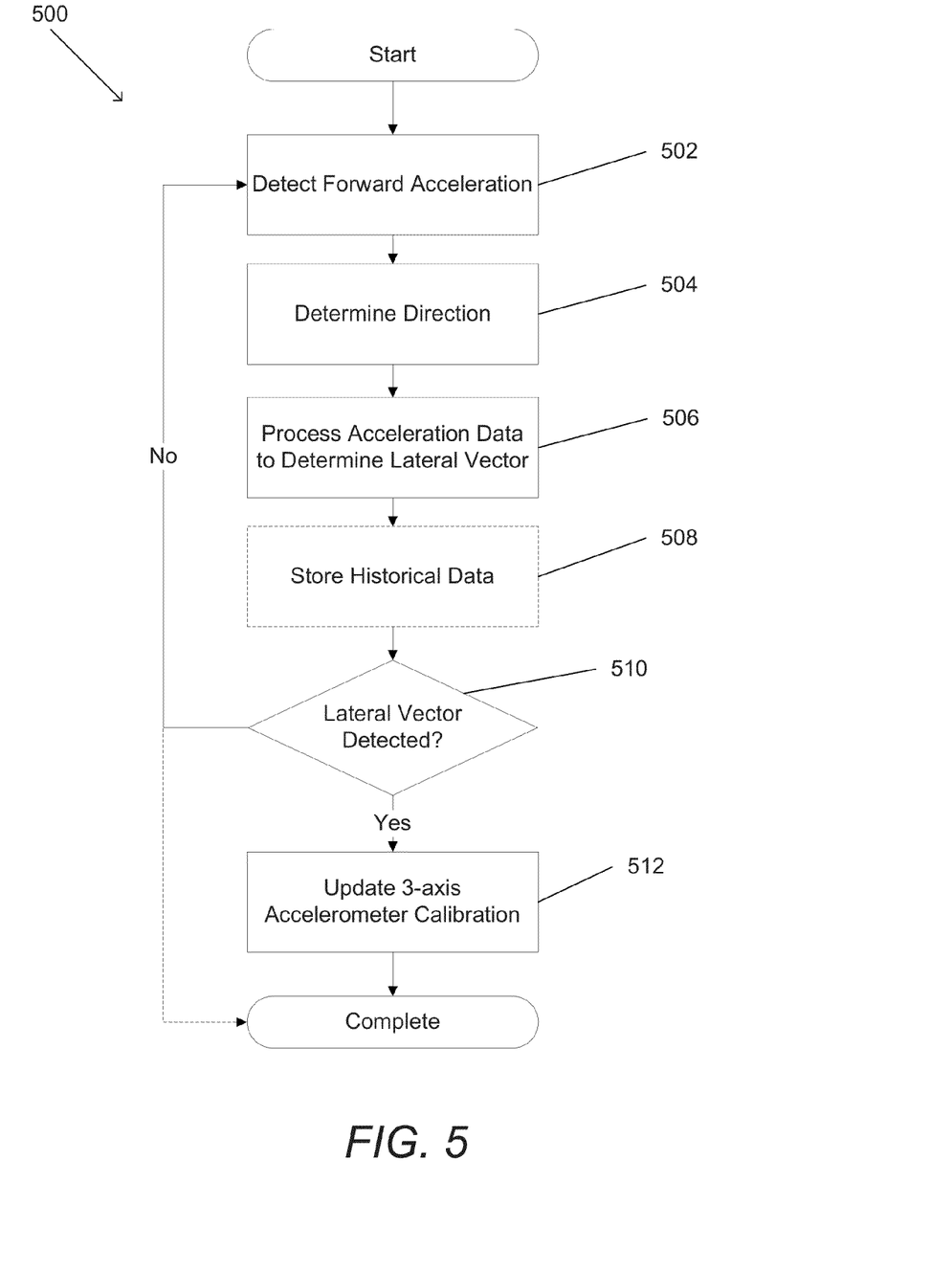
FIG. 5 is a flow chart illustrating a process for calibrating a 3-axis accelerometer along its lateral vector in accordance with an embodiment of the invention.

Filtering the lateral vector measured by a 3-axis accelerometer allows a telematics unit to compensate for measurement errors, including measurements made when a vehicle is moving backwards or turning very slightly. A process for calibrating a 3-axis accelerometer along its lateral axis in accordance with an embodiment of the invention is illustrated in FIG. 5. The process 500 includes detecting (502) data related to the forward acceleration of a vehicle. The direction of the acceleration is determined (504). The acceleration data is processed (506) to determine a lateral vector. In a number of embodiments, the acceleration data is stored (508) as part of all of the historical motion data. If a lateral vector is detected (510), the calibration of the 3-axis accelerometer is updated (512) using the lateral vector. In many embodiments, if no lateral vector is detected (510), the process 500 repeats. In several embodiments, if no lateral vector is detected (510), the process 500 is complete.

In many embodiments, detecting (502) data related to the forward acceleration of a vehicle includes determining that the velocity of the vehicle exceeds a threshold velocity. In several embodiments, the velocity of the vehicle may be detected (502) using a GPS receiver and/or a 3-axis accelerometer. The GPS receiver and/or 3-axis accelerometer may also be utilized to determine (504) the direction in which the vehicle is traveling. In a number of embodiments, the vehicle is traveling in a constant direction. Analysis of data received using a GPS receiver can determine (504) whether the direction of motion is unchanging by comparing current values to past values. Similarly, analysis of data received using a 3-axis accelerometer can determine (504) whether the direction of acceleration is unchanging by comparing current acceleration to past values for any changes in acceleration direction. Certain embodiments only use a GPS receiver or only use a 3-axis accelerometer to determine (504) constant direction; other embodiments use both a GPS receiver and a 3-axis accelerometer to determine (504) a constant direction. Several embodiments use a GPS receiver to check data received using a 3-axis accelerometer or vice versa. In various embodiments, a constant direction is not one in which data indicates the direction data is rigidly constant, but takes into account errors and discrepancies that may come from erroneous direction data, such as an inaccurate GPS reading or measurement errors in a 3-axis accelerometer.

Analysis of data can be used to determine whether the data is indicative of a lateral vector. Indications of a lateral vector can filter out data that is likely an outlier, such as data indicating that a vehicle is moving backward rather than forward. This can include filtering out events indicating that a vehicle is slowly backing out of a parking spot before turning and driving in a forward direction. Data analysis can utilize filters, including, but not limited to, least mean squares, least squares, and Gaussian elimination methods, including those described above with respect to FIG. 3.

A specific process is described above with respect to FIG. 5 for calibrating the forward axis of a 3-axis accelerometer with respect to a lateral vector; however, any of a variety of processes can be utilized, including processes that do not rely upon uniform forward motion of the vehicle, in accordance with an embodiment of the invention. Processes for calibrating a 3-axis accelerometer using an average forward vector in accordance with embodiments of the invention are discussed below.

3-Axis Accelerometer Calibration Using an Average Forward Vector

Figure 6:
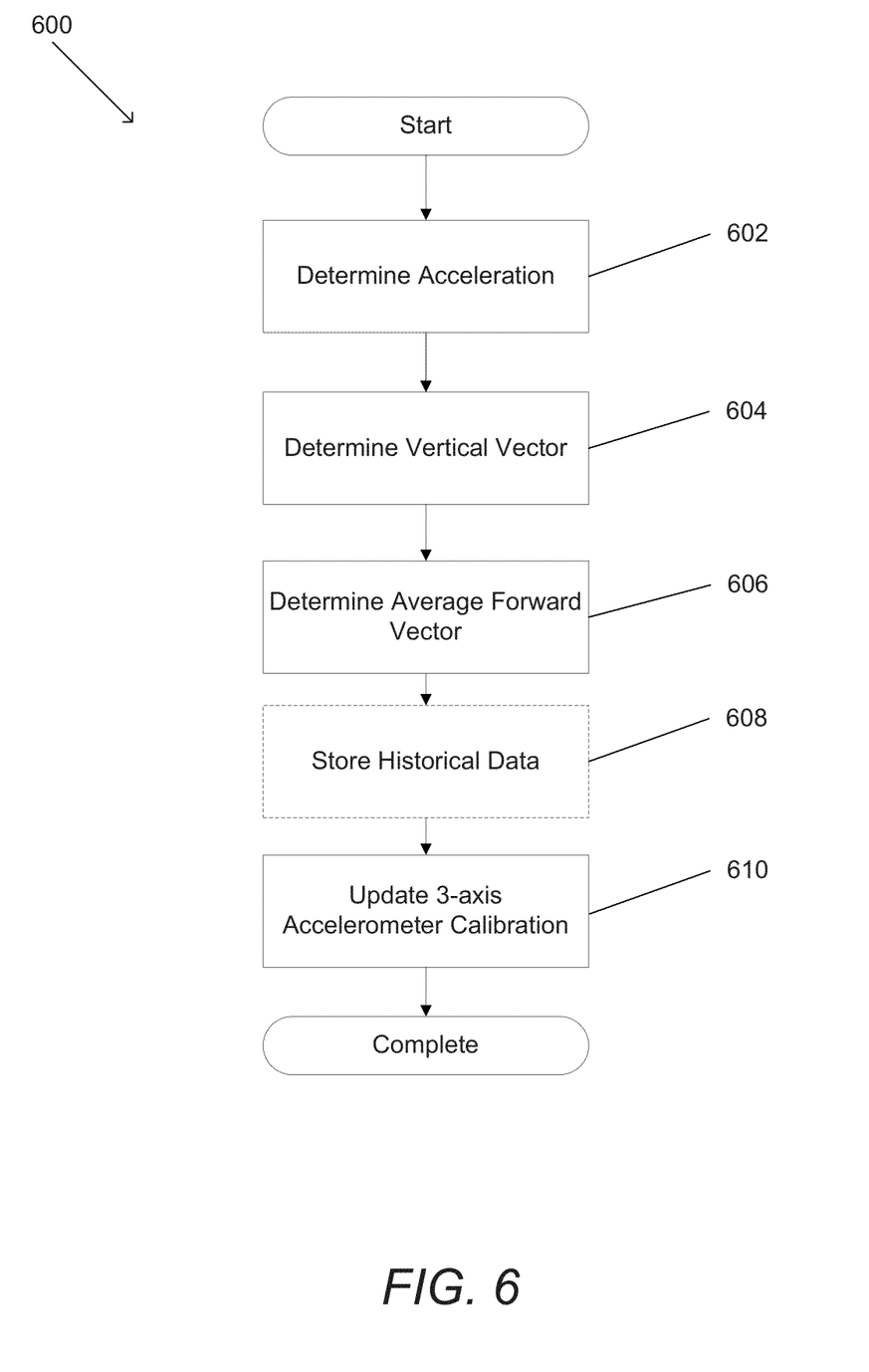
FIG. 6 is a flow chart illustrating a process for determining an average forward vector used in the calibration of 3-axis accelerometer in accordance with an embodiment of the invention.

Once a vertical vector and/or a lateral vector have been determined, an average forward vector can be computed; this average forward vector is used to calibrate the forward acceleration measured using a 3-axis accelerometer to the forward motion of the vehicle in which the 3-axis accelerometer is mounted. A process for determining an average forward vector used to calibrate a 3-axis accelerometer in accordance with en embodiment of the invention is illustrated in FIG. 6. The process 600 includes determining (602) acceleration information. A vertical vector is determined (604). An average forward vector is determined (606). In many embodiments, the vertical, lateral, and/or average forward vectors are stored (608) as historical data. The calibration of a 3-axis accelerometer is updated (610).

In many embodiments, acceleration information is determined (602) utilizing a GPS receiver and/or a 3-axis accelerometer. In many embodiments, the vertical vector is determined (604) using a process similar to the one described above with respect to FIG. 4. In a number of embodiments, determining (604) the vertical vector includes multiplying a normalized vertical vector by acceleration information stored as historical data. In several embodiments, determining (606) the average forward vector includes determining a lateral vector using a process similar to the one described above with respect to FIG. 5. In many embodiments, determining the lateral vector includes subtracting the determined (604) vertical vector from the determined (602) acceleration information. The vertical vector and/or acceleration information used to determine the lateral vector may be stored (608) as historical data. In a number of embodiments, determining (606) the average forward vector utilizes the lateral vector and the angle between the lateral vector and a measured forward vector. In several embodiments, the measured forward vector is determined using forward acceleration information captured using a 3-axis accelerometer. In many embodiments, the measured forward vector is a previously calculated average forward vectored stored as historical data. In a number of embodiments, determining (606) the average forward vector uses one or both of the determined (602) acceleration and the determined (604) vertical vector. In many embodiments, a certain amount of acceleration information and/or a certain number of vertical vectors and/or average forward vectors are stored (608) as historical data before the 3-axis accelerometer calibration is updated (610). The amount of acceleration information and/or number of vectors stored may be determined dynamically and/or pre-determined.

A specific process is described above with respect to FIG. 6 for calibrating a 3-axis accelerometer using a determined average forward vector; however, any of a variety of processes, including those which utilize an average lateral vector and those which determine a lateral vector, can be utilized in accordance with an embodiment of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A telematics system, comprising:
   a global positioning system (GPS) receiver;
   an accelerometer; and
   a processor;
   wherein the GPS receiver determines velocity information;
   wherein the accelerometer determines accelerometer acceleration information along a set of accelerometer axes comprising a first accelerometer axis in a first vector;
   wherein the telematics system is located in a vehicle having one or more vehicle axes;
   where:
     the vehicle axes comprise a first vehicle axis in a forward vector, a second vehicle axis in a lateral vector, and a third vehicle axis in a vertical vector; and
     the orientation of the accelerometer axes is independent of the orientation of the vehicle axes; and
   wherein the processor:
     receives a velocity information sample using the GPS receiver;
     determines GPS acceleration information along the one or more vehicle axes using the velocity information sample;
     receives accelerometer acceleration information samples using the accelerometer; and
     maps the first accelerometer axis to one of the one or more vehicle axes based on the GPS acceleration information sample and the accelerometer acceleration information sample, where the first vector of the calibrated first accelerometer axis corresponds to the vectors forward vector of the vehicle, by computing orthogonal vectors based on the cross product of every combination of the GPS acceleration information along the one or more vehicle axes, thereby calibrating the orientation of the accelerometer so that the first accelerometer axis corresponds to the forward vector of the vehicle.

2. The telematics system of claim 1, wherein:
the accelerometer is a 3-axis accelerometer further comprising a second accelerometer axis in a second vector and a third accelerometer axis in a third vector; and
the processor further:
  maps the second accelerometer axis to the lateral vector of the vehicle by analyzing the GPS acceleration information in the forward vector of the vehicle and the acceleration information samples corresponding to the first accelerometer axis, thereby calibrating the orientation of the accelerometer so that the second accelerometer axis corresponds to the lateral vector of the vehicle; and
  maps the third accelerometer axis to the vertical vector of the vehicle by processing the GPS acceleration information along the forward vector of the vehicle and the vertical vector of the vehicle, thereby calibrating the orientation of the accelerometer so that the third accelerometer axis corresponds to the vertical vector of the vehicle and the third vector is distinct from the first vector and the second vector.

3. The telematics system of claim 1, wherein:
the accelerometer comprises a first sampling rate; and
the telematics system further comprises an accelerometer accumulator accumulating a plurality of accelerometer acceleration information samples taken at the first sampling rate.

4. The telematics system of claim 3, wherein:
The GPS receiver comprises a second sampling rate; and
the telematics system further comprises a GPS accumulator accumulating a plurality of velocity information samples taken at the second sampling rate.

5. The telematics system of claim 4, wherein the processor is matches the first sampling rate to the second sampling rate.

6. The telematics system of claim 1, wherein the processor calibrates a vehicle axis to the first accelerometer axis using a least squares method.

7. The telematics system of claim 6, wherein the processor performs the least squares method using a Gaussian elimination solver.

8. The telematics system of claim 7, further comprising motion sample storage storing a plurality of motion samples, where motion samples are selected from the group consisting of GPS location information samples and accelerometer acceleration information samples.

9. The telematics system of claim 8, wherein the processor performs the least squares method using at least one motion sample in the plurality of motion samples.

10. The telematics system of claim 1, wherein the processor further:
  detects the vertical vector in the calibrated vehicle axes; and
  recalibrates the calibrated vehicles axes using the using the GPS acceleration information sample, the accelerometer acceleration information sample, and the detected vertical vector.

11. The telematics system of claim 1, wherein the processor further:
  detects the lateral vector in the calibrated vehicle axes; and
  recalibrates the calibrated vehicles axes using the using the GPS acceleration information sample, the accelerometer acceleration information sample, and the detected lateral vector.

12. A method for calibrating an accelerometer, comprising:
receiving velocity information samples using a telematics system, where the telematics system is located in a vehicle having one or more vehicle axes comprising a first vehicle axis in a forward vector, a second vehicle axis in a lateral vector, and a third vehicle axis in a vertical vector;
determining vehicle acceleration information samples along a vehicle axis in the one or more vehicle axes using the velocity information and the telematics system;
receiving accelerometer acceleration information samples along a set of accelerometer axes using the telematics system, where the orientation of the accelerometer axes is independent of the orientation of the vehicle axes and the set of accelerometer axes comprises a first accelerometer axis in a first vector; and
mapping the first accelerometer axis to one of vehicle axes based on using the vehicle acceleration information samples, the accelerometer acceleration information samples, and the telematics system, where the first vector of the calibrated first accelerometer axis corresponds to the forward vector of the vehicle by computing orthogonal vectors based on the cross product of every combination of the GPS acceleration information along the one or more vehicle axes, the lateral vector, and the vertical vector thereby calibrating the orientation of the accelerometer so that the first accelerometer axis corresponds to the forward vector of the vehicle.

13. The method of claim 12, wherein receiving velocity information samples using the telematics system further includes receiving the velocity information samples at a first sampling rate.

14. The method of claim 13, wherein receiving accelerometer acceleration information samples at a second sampling rate.

15. The method of claim 14, further comprising matching the first sampling rate to the second sampling rate using the telematics system.

16. The method of claim 12, wherein calibrating a vehicle axis to the first accelerometer axis includes performing a least squares method using the telematics system.

17. The method of claim 16, wherein performing the least squares method includes performing a Gaussian elimination solver using the telematics system.

18. The method of claim 17, further comprising storing a plurality of motion samples using the telematics system, where motion samples are selected from the group consisting of velocity information samples and accelerometer acceleration information samples.

19. The method of claim 17, further comprising performing the least squares method using at least one motion sample in the plurality of motion samples and the telematics system.

20. The method of claim 12, further comprising:
  detecting the vertical vector in the calibrated vehicle axes using the telematics system; and
  recalibrating the calibrated vehicles axes using the using the GPS acceleration information sample, the accelerometer acceleration information sample, the detected vertical vector, and the telematics system.

21. The method of claim 12, further comprising:
  detecting the lateral vector in the calibrated vehicle axes using the telematics system; and recalibrating the calibrated vehicles axes using the using the GPS acceleration information sample, the accelerometer acceleration information sample, the detected lateral vector, and the telematics system.

* * * * *